Figure 1:
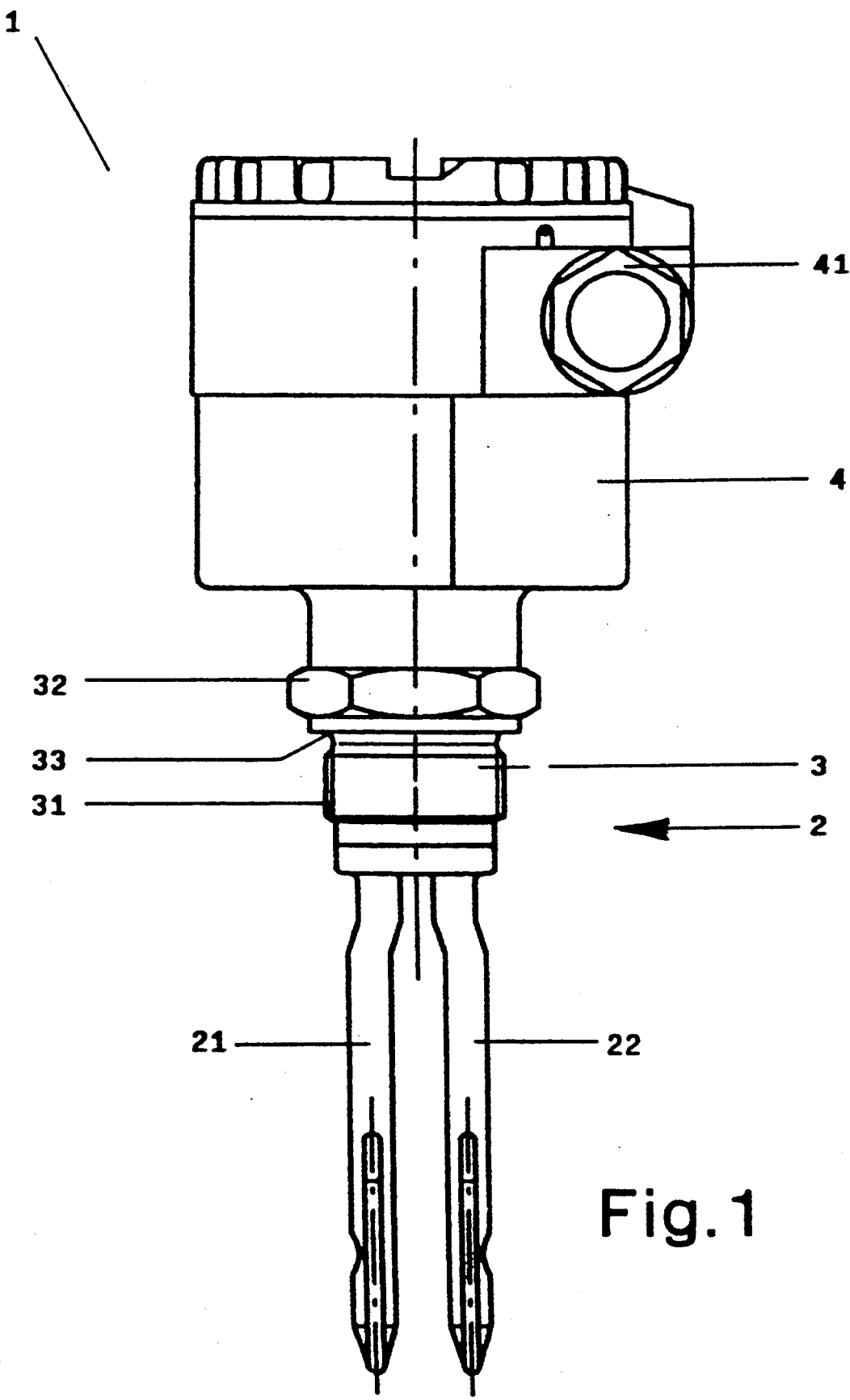

United States Patent [19]

Rottmar

[11] Patent Number: 5,440,455

[45] Date of Patent: Aug. 8, 1995

[54] DEVICE FOR FASTENING A HOUSING

[75] Inventor: Werner Rottmar, Steinen, Germany

[73] Assignee: Endress + Hauser GmbH + Co., Germany

[21] Appl. No.: 244,596

[22] PCT Filed: Sep. 21, 1993

[86] PCT No.: PCT/DE93/00904

§ 371 Date: Jun. 1, 1994

§ 102(e) Date: Jun. 1, 1994

[87] PCT Pub. No.: WO94/08213

PCT Pub. Date: Apr. 14, 1994

[30] Foreign Application Priority Data

Oct. 5, 1992 [DE] Germany .................. 42 33 315.6

[51] Int. Cl.⁶ .......................... H01H 9/20; H02B 7/04
[52] U.S. Cl. ................................ 361/809; 200/61.2;
200/295; 248/27.1; 361/284; 361/752; 403/259
[58] Field of Search ............... 403/24, 256, 259;
248/27.1; 307/118; 361/284, 736, 752, 807, 809;
73/273, 307, 308, 313; 340/623-625; 200/61.2,
81 R, 84 R, 84 C, 293, 295, 296, 303

[56] References Cited

U.S. PATENT DOCUMENTS

| 3,689,013 | 9/1972 | Neugebauer . | |
|---|---|---|---|
| 4,465,006 | 8/1984 | Dreier | 112/292 |
| 4,574,328 | 3/1986 | Maier . | |
| 5,146,056 | 9/1992 | Kuczynski | 200/296 |
| 5,230,422 | 7/1993 | Karweik | 200/307 |
| 5,359,497 | 10/1994 | Booth | 361/807 |

FOREIGN PATENT DOCUMENTS

| 1140352 | 11/1962 | Germany . |
|---|---|---|
| 2330679 | 3/1975 | Germany . |
| 3337481A1 | 4/1985 | Germany . |
| 1518818 | 7/1978 | United Kingdom . |
| 1599695 | 10/1981 | United Kingdom . |

Primary Examiner—Gerald P. Tolin
Attorney, Agent, or Firm—Barnes & Thornburg

[57] ABSTRACT

The innovation pertains to a device for fastening the housing of a data sensing element which encloses electronic circuits and connecting elements. Data sensing elements of this type are fastened in the wall which encloses the medium to be measured by means of a screw insert. Depending on their function, these data sensing elements may assume a position in which the connection of the connecting lines leading to a control room which is situated at a distance from the measuring point is only possible with great difficulties. This is the reason why the housing should be adjustable axially symmetrically relative to the screw insert. According to the solution suggested, the separable connection between the housing and the screw insert is formed by only one easily accessible screw which penetrates through a clamping disk and by projections which penetrate into a groove of the screw insert. The position of the clamping ring may be altered by tightening and loosening the screw such that a clamping connection is formed between the projections of the clamping ring and the groove of the screw insert, whereby said clamping connection facilitates that the electronics housing may be fixed in any axially symmetrical position relative to the screw insert.

17 Claims, 3 Drawing Sheets

DEVICE FOR FASTENING A HOUSING

DESCRIPTION

The invention pertains to a device for fastening a housing, in particular the electronics housing of a data sensing element, with a screw insert for fastening the data sensing element in the wall which encloses the medium to be measured, a sensor for physically recording the data, and a separable connection by means of which the electronics housing is connected with the screw insert as well as fixed and retained in its axially symmetric position relative to the sensor.

Housings of this type have the purpose of enclosing the electronic circuits as well as the electronic connecting elements of sensors such that they are insulated and protected against the environment. This is necessary because sensors of this type are used to detect the physical properties of the media. In this, the sensors situated at the measuring point are exposed to a wide variety of damaging environmental influences.

Sensors of this type are usually physical data sensing elements which determine the physical properties of the media, e.g., the level, the pressure, the temperature, etc. Such a data sensing element may, for example, be a capacitive probe, a vibration limit switch, a pressure sensor, a temperature sensor, or a different type of sensor. In order to fulfill their function, these data sensing elements are, in addition to the means for recording the data physically, also equipped with electric components by means of which the physical data is transformed into an electrical signal. These electrical components are realized as an electronic circuit on a printed circuit board.

If the data sensing element is, for example, a vibration limit switch, the sensor of which is used for determining and/or monitoring the level of a container, the electronics housing also encloses additional electronic circuits which have the purpose of exciting the sensor to oscillate. However, the connecting elements for the electrical connecting lines, by which the data sensing element receives the electrical energy required to fulfill is function and transmits the electrical signal to an evaluation device or an actuator arranged at a distance from the measuring point, are also enclosed by the electronics housing.

Due to the harsh environment at the measuring point, it is necessary to enclose the connection between the electronics housing and the screw insert at least to such an extent that it is sealed against dust and splashed water. This is the reason why the connection between these components is particularly important for maintaining the functional safety of such data sensing elements.

In order to connect the electrical connections to the electrical connecting elements which are enclosed by the electronics housing, it is necessary to align the electronics housing axially symmetrically in a position which corresponds with the connecting lines or other local conditions, despite the installation position required for the proper function of the sensor and the seal against the container wall. Thus, it is customary to design the electronics housing in such a way that it is fastened on the screw insert and may be turned by a certain axial angle as well as fixed in any favorable position with respect to the connection of the electrical connecting lines.

Figure 2:
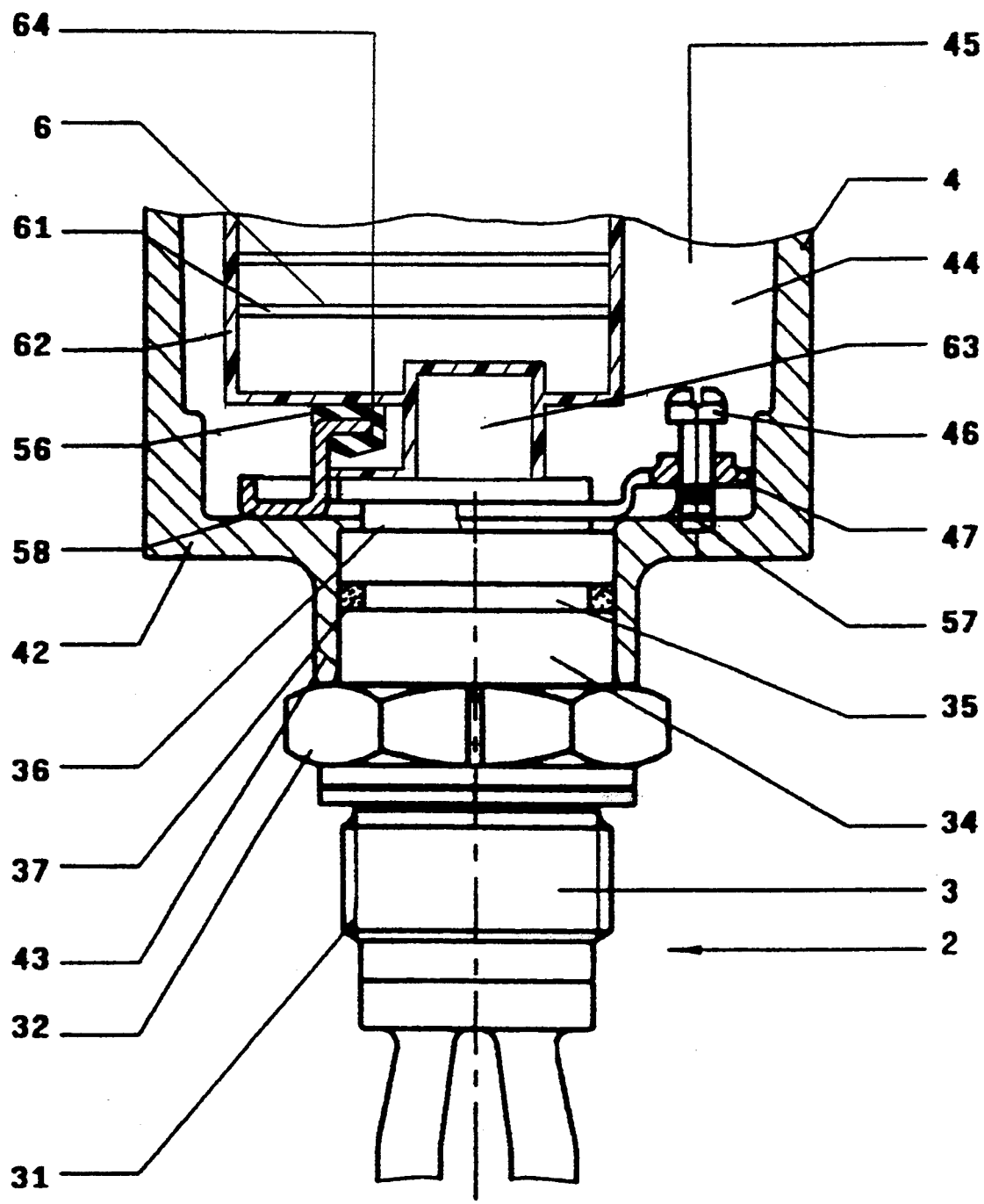
Figure 3B:
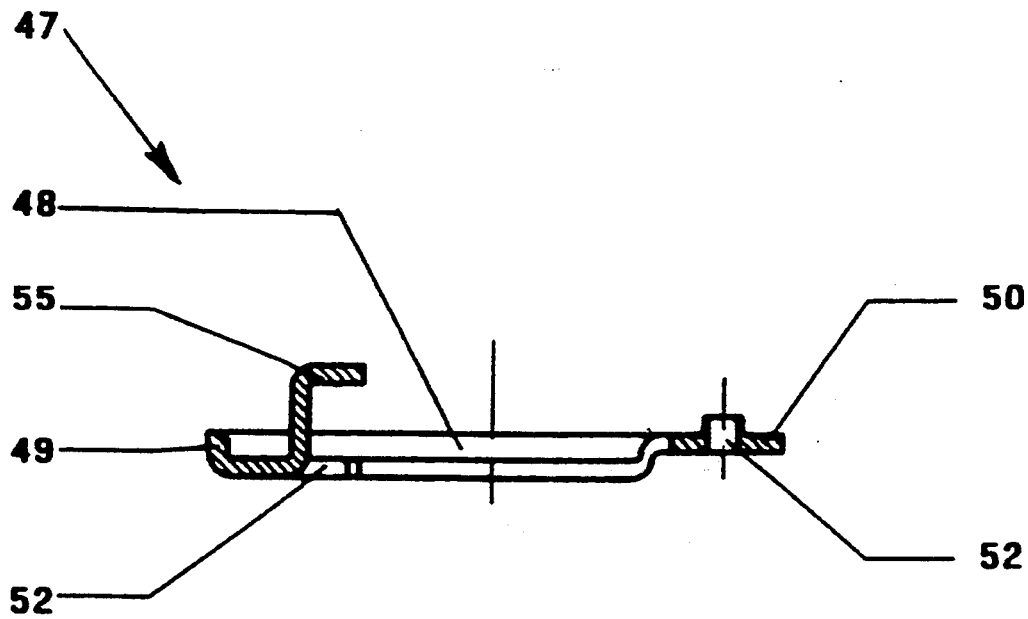
Figure 3A:
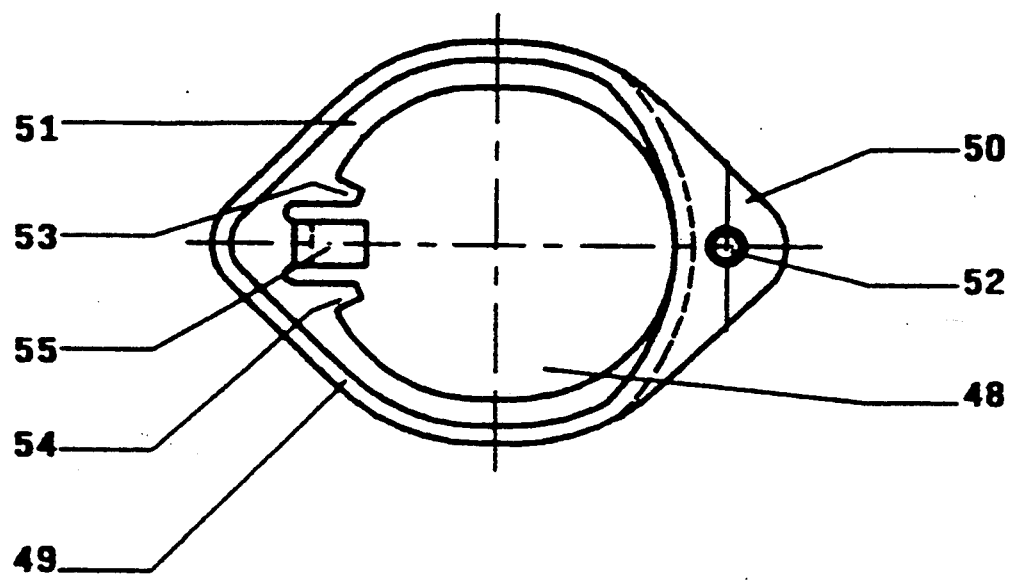

German Patent (ALS) No. 2,744,864, in particular FIGS. 1, 2, and 3, discloses a capacitive probe comprising a probe rod which represents the sensor, a screw insert for fastening the probe in a container wall, and the electronics housing. In order to realize the separable connection of the housing, three threaded bolts are distributed symmetrically on the screw insert, whereby these threaded bolts in association with three nuts form a separable connection between the electronics housing and the screw insert, and a seal and a clamping ring are inserted between the bolt and the nut.

Great Britain Patent No. 1,518,818, in particular FIG. 4, discloses a capacitive probe in which cylindrical screws and threaded bores form the separable connection between the electronics housing and the screw insert instead of threaded bolts and nuts.

The disadvantage of all these fastening methods can be seen in the fact that the electronics housing may only assume different positions relative to the sensor axially, and that all three screw connections must be separated entirely, the housing must be turned, and fixed anew in the new position by means of the three screw connections. In addition, the electrical circuit arranged above the screw connection must be disconnected, removed, and reinserted as well as reconnected in order to change the position of the housing. The three screw connections also represent a substantial expenditure with respect to time and labor.

In order to improve this state of the art, connections between electronics housings and screw inserts have been introduced in which the electronics housing may be turned variably by almost 360° around its axis of symmetry without requiring that the electronic circuit be disconnected or a screw connection be separated. However, this type of connection has the disadvantage that the housing may not be fixed in its position relative to the sensor, i.e., the housing may be turned after connecting the connecting lines, thus causing said connecting lines to possibly be easily damaged.

The objective of the invention, in contrast, is to suggest a separable connection between the electronics housing and the screw insert which is sealed against dust and splashed water, in which the electronics housing may also be turned variably in axial direction by almost 360° around its axis of symmetry, but fixed in any arbitrary position relative to the screw insert and easily separated as well as refastened. In addition, the suggested solution insures that the electronic circuits arranged in the interior of the electronics housing are fixed in their position when turning the housing.

This objective is attained by the characteristics disclosed in claim 1.

Additional characteristics of the invention are disclosed in the subclaims.

The invention is described in detail below with the aid of the figures.

The figures show:

FIG. 1 an illustration of a level measuring device utilizing the invention,

FIG. 2 a section through the device, and

FIG. 3 a section and a top view of the clamping disk utilized according to the invention.

FIG. 1 shows a data sensing element 1, namely a level measuring device for measuring and/or monitoring the level of a container which is not illustrated in the figure. The level measuring device 1 is arranged in the wall of the container such that it may come in contact with the medium to be measured once said medium has reached a predetermined level. The level measuring device 1 comprises the sensor 2, the screw insert 3, and the electronics housing 4.

The screw insert 3 has a thread 31 and a hex-nut 32. The hex-nut 32 serves for applying the torque required to screw the thread 31 [sic] of the level measuring device 1 into a threaded bore which that penetrates through the container wall. In order to seal the threaded bore, the screw insert 3 is pressed against the container wall with the sealing surface 33, whereby a sealing ring which is not shown in the figures is inserted between the sealing surface and the container wall. Due to this sealing arrangement, the level measuring device assumes a fixed position in the container wall depending on its respective function.

In order to determine if the sensor is covered by the material to be monitored, the sensor 2 and thus the oscillating rods 21,22 are excited to oscillate in opposite directions by means of an excitation circuit which is enclosed by the electronics housing 4. Once the oscillating rods come in contact with the medium to be measured, the oscillation frequency of the oscillating rods 21,22 and thus of the sensor is changed. The level measuring device 1 is provided with one additional circuit for determining the change in the oscillation frequency, whereby said additional circuit is also situated in the electronics housing 4. The connecting lines are inserted into the housing 4 by means of the PG-screw connection 41 in order to produce the connection with the electrical connecting lines, by which the level measuring device 1 is connected with a measuring station that is situated at a distance from the measuring point, and by which the level measuring device 1 receives the energy required to fulfill its function as well as transmits an electric signal which corresponds with the measured value to said measuring station.

It occurs quite frequently that the connection of the connecting lines in the electronics housing 4 is very difficult to realize because the electronics housing 4 assumes a position in which the insertion elements and connecting elements are difficult to access. This difficulty may be caused by lines that are installed in a fixed position or other constricted conditions at the measuring point. However, since the position of the fixed sensor in the container wall may not be changed, the connection between the screw insert 3 and the electronics housing 4 must be designed in such a way that the electronics housing 4 may change its position axially, thus facilitating that the housing assumes a position in which a simple connection of the connecting lines may be carried out.

FIG. 2 shows a partial section through the screw insert 3 and the electronics housing 4. On the side opposing the thread 31, a tubular pin 34 is situated adjacent to the hex-nut 32. The pin 34 does not have the same diameter over its entire length, but has two short sections 35,36 of smaller diameter. A sleeve 43 is formed onto the base 42 of the housing 4 in order to fasten the housing 4 onto the screw insert 3 and to arrange the connecting lines between the sensor and the electronic circuit. The pin 34 penetrates the sleeve 43 entirely and protrudes into the interior 44 of the housing 4 by a short distance. The short sections 35,36 of small diameter form two grooves. An annular sealing ring which seals the interior 44 of the housing 4 against dust and splash water is arranged in the groove formed by section 35.

The electric circuits 6 of the level measuring device 1 are realized on a printed circuit board 61 by means of electronic components and connecting lines not shown in the figures. The circuits 6 are enclosed by the insulating body 62 in order to insulate the same electrically. However, the insulating body 62 does not penetrate the interior 44 of the housing 4 entirely, but leaves free a space 45 of the base surface of a circular section. At the base of the insulating body 62 protrudes an insulating bushing 63 which encloses the interior electrical connections between the sensor 2 and the electrical circuits 6 such that they are insulated.

The separable connection between the screw insert 3 and the electronics housing 4 which may be turned variably by almost 360° and fixed in any arbitrary position is formed by only one easily accessible cylindrical screw 46. For this, the cylindrical screw 46 penetrates through a clamping ring 47. In inserted condition, the clamping ring 47 assumes a position in which it is penetrated by the pin 34 and braces itself in the groove 36 of the pin 34.

FIG. 3 shows a section through the clamping ring 47 as well as a top view of the same. The clamping ring 47 has an approximately ellipsoid shape and is provided with an opening 48. However, the opening 48 is not circular, but rather has a slightly longer extent in the longitudinal direction of the clamping ring 47. A collar 49 extends around the clamping ring 47, but not entirely, but rather such that it ends in a holding plate 50. The holding plate 50 assumes a position in which it extends parallel to the base 51 at a small distance from the same. The holding plate 50 is penetrated by a threaded bore 52. Two projections 53,54 penetrate into the opening 48. Said projections form the locking elements by means of which the housing 4 is fixed in its respective position. In addition, a carrier 55 is formed onto the clamping ring 47. The carrier 55 penetrates a holding arrangement 64 formed onto the base of the insulating body 62 while being enclosed by an elastic plug 56.

The separable connection between the screw insert 3 and the electronics housing 4 is realized by inserting the pin 43 of the screw insert 3 which is provided with the sealing ring 37 into the sleeve 43 of the housing 4. Subsequently, the clamping ring 47 is placed on the base 42 of the interior 44 of the housing 4 after screwing in the cylindrical screw 46. In this position, the pin 34 already penetrates through the opening 48. The clamping ring 47 is now displaced parallel to the surface of the base 42 until the cylindrical screw 46 assumes a position above the supporting hole 47 situated in the base 42. In this position, both projections 53,54 penetrate into the groove formed by section 36. The easily accessible cylindrical screw 46 is now screwed further into the threaded bore 52 by means of a screwdriver. During this process, the cylindrical screw 46 braces itself against the base of the supporting hole 57. The cylindrical screw 46 lifts the holding plate 50 off the clamping ring 47. The clamping ring 47 performs a swiveling movement around the pivoting point 58 during this process. This swiveling movement may continue until the projections 53,54 brace themselves against the annular wall surface of the groove formed by section 36 which faces the interior 44. The different lever arms between the pivoting point 58 and the projection 53,54 on one hand and the projections 53,54 and the cylindrical screw 46 on the other hand cause that a clamping connection is created between the projections 53,54 and the wall of the groove 36 which firmly fixes the electronics housing 4 in its position. In order to change the position of the electronics housing 4, only the easily accessible cylindrical screw 46 must be loosened to facilitate that the electronics housing 4 may be turned by almost 360° around its axis of symmetry on the pin 34, and that said electronics housing is retained during this movement by the projections 53,54 which penetrate into the groove 36 in a sliding fashion. The clamping connection is reestablished by tightening the cylindrical screw 46, thus fixing the electronics housing 4 in its new position relative to the screw insert 3.

Immediately after mounting the clamping ring 47, the electronic circuit may be mounted by inserting the complete insulating body 62 into the interior 44. This is possible since the only connecting screw 46 of the separable connection is easily accessible at any time despite the fact that the electronic circuit 6 is inserted into the space 45.

In assembled condition, the insulating body 62 assumes a position in which the carrier 55 of the clamping disk 47 as well as the elastic pin 56 penetrates the holding arrangement 64. This causes the insulating body 62 to also be turned while being retained in its position relative to the housing during each rotational movement of the housing 4 around its axis of symmetry, so that any damage to the internal connecting lines between the sensor 2 and the electronic circuit 6 due to the axial rotation of the electronics housing 4 is prevented.

I claim:

1. Device for fastening a housing, in particular the electronics housing of a level measuring device, with a screw insert by means of which the level measuring device is fastened in the wall which encloses the medium to be measured, a sensor for detecting the measured value physically, and a separable connection by means of which the electronics housing is connected with the screw insert as well as fixed and retained axially in its position relative to the sensor, characterized by the fact that the separable connection between the electronics housing (4) and the screw insert (3) is formed by only one screw (46) which penetrates through a clamping disk (47), and by projections (53,54) of the clamping disk (47) which engage into a groove (36) of the screw insert (3).

2. Device according to claim 1, characterized by the fact that the clamping disk (47) may be swiveled around a pivoting point (58) by tightening or loosening the screw (46).

3. Device according to claim 1, characterized by the fact that the projections (53,54) of the clamping disk (47) brace themselves against an annular surface of the groove (36) of the screw insert (3) in such a way that a clamping connection is formed between the projections (53,54) and the groove (36), whereby said clamping connection fixes the electronics housing (4) in any axially symmetrical position relative to the sensor.

4. Device according to claim 3, characterized by the fact that the clamping connection (36,53,54) is tightened by inserting the screw (46) and loosened by removing said screw.

5. Device according to claim 4, characterized by the fact that the screw (46) braces itself against the base (42) of the housing (4) while penetrating a threaded bore (52) of the holding plate (50) of the clamping disk (47).

6. Device according to claim 1, characterized by the fact that the pin (34) of the screw insert (3) penetrates through the sleeve (43) of the housing (4) and the opening (48) of the clamping disk (47).

7. Device according to claim 6, characterized by the fact that the electronics housing (4) may be swiveled axially symmetrical around the pin (34).

8. Device according to claim 1, characterized by the fact that the circuit (6) of the level measuring device (1) which is enclosed by the insulating body (62) assumes a position in the interior (44) of the housing (4) which forms a free space (45) for loosening or tightening the screw (46).

9. Device according to claim 6, characterized by the fact that the clamping disk (47) may be displaced laterally parallel to the surface of the base (42) of the housing (4).

10. Device according to claim 8, characterized by the fact that a holding arrangement (64) is formed onto the insulating body (62), whereby the carrier (55) of the clamping disk (47) engages into said holding arrangement with an intermediate elastic plug (56) in such a way that the insulating body (62) is retained in its position and turned when swiveling the housing (4) axially symmetrical.

11. Device according to claim 1, characterized by the fact that the connection between the electronics housing (4) and the screw insert (3) is sealed against dust and sprayed water.

12. Device according to claim 2, characterized by the fact that the circuit (6) of the level measuring device (1) which is enclosed by the insulating body (62) assumes a position in the interior (44) of the housing (4) which forms a free space (45) for loosening or tightening the screw (46).

13. Device according to claim 3, characterized by the fact that the circuit (6) of the level measuring device (1) which is enclosed by the insulating body (62) assumes a position in the interior (44) of the housing (4) which forms a free space (45) for loosening or tightening the screw (46).

14. Device according to claim 4, characterized by the fact that the circuit (6) of the level measuring device (1) which is enclosed by the insulating body (62) assumes a position in the interior (44) of the housing (4) which forms a free space (45) for loosening or tightening the screw (46).

15. Device according to claim 5, characterized by the fact that the circuit (6) of the level measuring device (1) which is enclosed by the insulating body (62) assumes a position in the interior (44) of the housing (4) which forms a free space (45) for loosening or tightening the screw (46).

16. Device according to claim 6, characterized by the fact that the circuit (6) of the level measuring device (1) which is enclosed by the insulating body (62) assumes a position in the interior (44) of the housing (4) which forms a free space (45) for loosening or tightening the screw (46).

17. Device according to claim 7, characterized by the fact that the circuit (6) of the level measuring device (1) which is enclosed by the insulating body (62) assumes a position in the interior (44) of the housing (4) which forms a free space (45) for loosening or tightening the screw (46).

* * * * *